US008621574B2

(12) United States Patent
Esteve Balducci et al.

(10) Patent No.: US 8,621,574 B2
(45) Date of Patent: Dec. 31, 2013

(54) OPAQUE QUARANTINE AND DEVICE DISCOVERY

(75) Inventors: Juan V. Esteve Balducci, Sammamish, WA (US); John Atwood, Duvall, WA (US); Zhike Kong, Sammamish, WA (US); Ying Zhang, Issaquah, WA (US); Sergey B. Plakhotnyuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 12/476,966

(22) Filed: Jun. 2, 2009

(65) Prior Publication Data

US 2010/0306827 A1 Dec. 2, 2010

(51) Int. Cl.
*G06F 21/00* (2013.01)
(52) U.S. Cl.
USPC ............... 726/4; 380/279; 380/44; 713/151; 709/203; 709/219; 705/26; 705/30; 705/67
(58) Field of Classification Search
USPC ............................................................ 726/4
See application file for complete search history.

(56) References Cited

U.S. PATENT DOCUMENTS

| 7,992,198 | B2* | 8/2011 | Guarraci et al. | 726/9 |
|---|---|---|---|---|
| 2003/0074584 | A1 | 4/2003 | Ellis | 726/22 |
| 2003/0229900 | A1* | 12/2003 | Reisman | 725/87 |
| 2005/0267954 | A1 | 12/2005 | Lewis et al. | 709/221 |
| 2006/0041891 | A1* | 2/2006 | Aaron | 719/315 |
| 2006/0101409 | A1 | 5/2006 | Bemmel | 717/126 |
| 2006/0136570 | A1* | 6/2006 | Pandya | 709/217 |
| 2006/0195899 | A1 | 8/2006 | Ben-Shachar et al. | 726/12 |
| 2006/0230124 | A1* | 10/2006 | Belfiore et al. | 709/219 |
| 2007/0100850 | A1 | 5/2007 | Choe et al. | 707/100 |
| 2007/0143392 | A1 | 6/2007 | Choe et al. | 709/203 |
| 2007/0192867 | A1* | 8/2007 | Miliefsky | 726/25 |
| 2007/0198525 | A1 | 8/2007 | Chatterjee et al. | 707/10 |
| 2007/0282951 | A1* | 12/2007 | Selimis et al. | 709/205 |
| 2009/0094365 | A1* | 4/2009 | Orady et al. | 709/226 |
| 2009/0310788 | A1* | 12/2009 | Garrido et al. | 380/279 |
| 2010/0100964 | A1* | 4/2010 | Mahaffey et al. | 726/25 |
| 2011/0314145 | A1* | 12/2011 | Raleigh et al. | 709/224 |

OTHER PUBLICATIONS

A unified framework for enforcing multiple access control policies http://pdf.aminer.org/000/598/965/a_unified_framework_for_enforcing_multiple_access_control_policies.pdf|Jajodia et al. |1997|pp. 1-12.*
Intel Corporation, "Intel® Active Management Technology System Defense and Agent Presence Overview," pp. 1-26, Feb. 2007, <http://cache-www.intel.com/cd/00/00/32/09/320960_320960.pdf>.
Sarid, Tal, Microsoft Corporation, "Microsoft Technet: Professor Windows," pp. 1-5, Apr. 2005, <http://technet.microsoft.com/en-us/library/bb878019.aspx>.
Sophos.com, "Sophos NAC for Endpoint Security and Agent Configuration Guide Version 3.1.2," pp. 1-25, Feb. 2009, <http://sophos.com/sophos/docs/eng/manuals/nacag_312_meng.pdf>.

* cited by examiner

*Primary Examiner* — Mahfuzur Rahman
(74) *Attorney, Agent, or Firm* — Merchant & Gould

(57) ABSTRACT

Embodiments described herein provide communication control features and functionality, but are not so limited. In an embodiment, a computing environment includes an access control component that can use a number of access states to control access to computing data and/or services. In one embodiment, a server computer can control access to data and/or services using a number of access states including, but not limited to: an allowed state, a blocked state, a device discovery state, and/or a quarantined state. Other embodiments are available.

18 Claims, 6 Drawing Sheets

OPAQUE QUARANTINE AND DEVICE DISCOVERY

BACKGROUND

There are many types of mobile devices available to consumers, such as mobile phones, smartphones, personal data assistants (PDAs), and other personal computing devices. Today, it is not uncommon for a person to have a mobile phone, portable music/video device, PDA, laptop, and/or a desktop computer. Some of these devices typically include one or more applications which allow a user to surf the Internet, send/receive electronic (e-mail), access networked folders and data, draft documents, maintain contacts, maintain schedules, organize finances, etc.

Users of multiple devices can manually update and manage information across the various devices or use an application to include project data, voice mail messages, e-mail, short message service (SMS) messages, contacts, notes, calendar items, and/or tasks between select mobile devices, client computer(s), and/or server(s). For example, a user may wish to synchronize contact data and e-mail between a smartphone, a personal computer (desktop, laptop, etc.) at the office and/or at home. Consequently, users can track messages, e-mail, calendar appointments and schedules, contacts, notes, and/or tasks, etc. with a mobile device.

Correspondingly, with the popularity and use of available mobile devices, it has become difficult to manage and maintain information as to which mobile devices may or may not be acceptable as synchronizing clients. To ensure device compatibility and trustworthiness, some companies allow employees to use company-approved devices, requiring the user to register each approved device with the information technology (IT) administrator or system before allowing the user to synchronize the device with an enterprise server for example. However, if a user would like to use an unapproved mobile device, the user may not be able to use the device to access company resources, potentially leading to user frustration. Additionally, it can be a daunting (and often futile) task for an administrator to control access to a network and/or associated resources since it may be unclear as to whether a particular device conforms with required company policies, security features, etc.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments described herein provide communication control features and functionality, but are not so limited. In an embodiment, a computing environment includes an access control component that can use a number of access states to control access to computing data and/or services. In one embodiment, a server computer can control access to data and/or services using a number of access states including, but not limited to: an allowed state, a blocked state, a device discovery state, and/or a quarantined state. Other embodiments are available.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
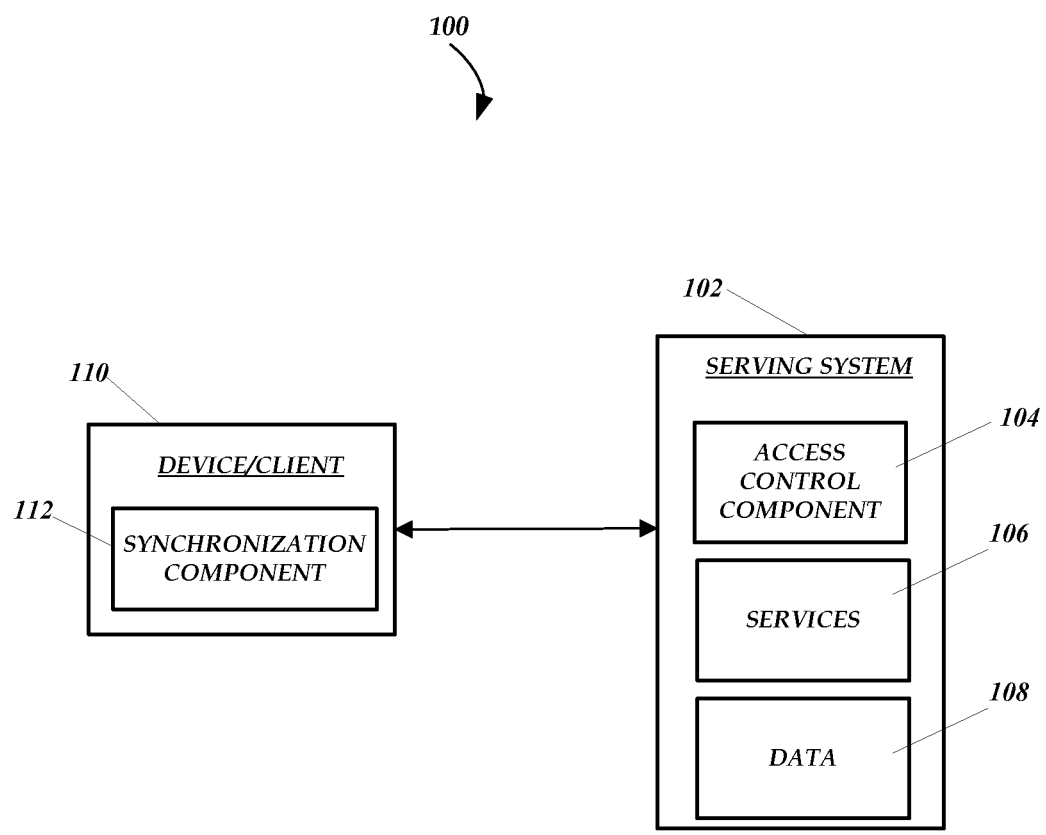
FIG. 1 is a block diagram of an exemplary computing environment having components that can be configured with access control and communication features.

FIG. 1 is a block diagram of an exemplary computing environment 100 having a number of components that can be configured to provide access control and communication features and functionality, as described below. In accordance with various embodiments, components of the computing environment 100 can be used to control communications and access to requested data and/or services using various access or control states, but are not so limited.

In one embodiment, a serving system 102 of the computing environment 100 can use an access control component 104 and various access or control states to control which user devices are allowed to obtain synchronization data and/or services from the serving system 102, or some other system or application for example. As described below, the access control component 104 can operate to control access to certain computing services and/or data, such as synchronization services and/or data based in part on an allowed control state, a blocked control state, a quarantined control state, and/or device discovery control state, but is not so limited. For example, a server platform (e.g., Exchange® server) can use the access control component 104 and various states to control synchronization and other communications between user devices and the serving system 102.

For example, an allowed state can be assigned and used for each trusted or trustworthy device and/or client, a blocked state can be assigned and used for each untrustworthy device and/or client, a device discovery state can be assigned and used for each newly introduced device and/or client, and/or a quarantined state can be assigned and used for each unknown device and/or client while determining a level or trust or other confidence parameter for each device and/or client. As described below, the quarantined state can be used by the system 100 to prevent access to certain data and/or services requested by a requesting device or client as part of providing normal communication (e.g., synchronization) operations from the client's perspective. For example, the quarantined state can be used as part of a synchronization service to prevent a synchronization client from obtaining requested data and/or services, such as e-mail, contacts, appointments, etc. while an administrator examines certain operational characteristics of an associated device to determine a corresponding trust level.

In one embodiment, the device discovery state can be used by the system 100 as part of an artificial quarantine or device discovery state to gather sufficient information about requesting clients to automatically implement block, allow, and/or quarantine decisions. For example, the device discovery and/or quarantine states can be used by the system 100 to delay access and use operations as part of determining device and/or user trust levels (e.g., running an integrity check to determine operational characteristics of a device, checking stored device information of a database for current access state(s), status, and/or reasons, etc.), such when new or recycled devices are being introduced or reintroduced to a computing network. In certain cases, transitions into an actual quarantine state can require administrator interaction or interdiction to explicitly allow or block a given client or device from a given computing or communication environment.

As shown in the exemplary computing environment 100 of FIG. 1, and in accordance with an embodiment, the serving system 102 includes an access control component 104 configured to control access to server services 106 and/or data 108, such as synchronization services and data for example. In an alternative embodiment, the functionality of the access control component 104 can be included in another component or components and used as part of an access control feature of a computing or communication environment. In one embodiment, control of the various states can be based in part on information and/or an identity of a requesting user and/or a type of requesting device, system, and/or application, some of which can be stored in computer storage.

In some cases, the amount of identification and other information that can be provided by each requesting device may be limited or not, depending in part on the functionality of a particular device and/or synchronization component or application. In various embodiments, certain devices can be configured to automatically communicate additional device information as part of a synchronization operation or communication. For example, certain devices can transmit device information with a service request, such as: operating system and/or version, synchronization application and/or version, license version, language, model, device type, phone number, IP address, International Mobile Equipment Identity (IMEI), a list of installed and/or running applications, a list of configured and/or active data channels, etc.

Communications can include one or more standard packet-based formats, e.g., H.323, internet protocol (IP), Ethernet, Asynchronous Transfer Mode (ATM), etc. or some other communication format or functionality. Additionally, each requesting computing device can include certain communication functionality to communicate data packets and other information for example. In one embodiment, communicated data packets include requests to synchronize with the serving system 102, and can include additional information for use in assessing a trust or other confidence level of a requesting device or client.

Any additional data can be used by the access control component 104, certain user(s) (e.g., administrator(s)), or some other component or system, to make block, allow, and/or quarantine determinations and assessments. In one embodiment, transferred client characteristics and other factors, such as an interaction pattern and actions of a particular client for example, can also be used to control access to certain data and/or services. For example, a user who has recently accessed calendar appointments may still be allowed to access calendar appointments while preventing access to other data as part of a quarantining operation.

With continuing reference to FIG. 1, a user device 110 of an embodiment, such as a smartphone or other portable communication/computing device for example, can include a synchronization client or component 112 that can be used to access synchronization services and data from the serving system 102. For example, the synchronization client or component 112 can be implemented as a computer program having ActiveSync® functionality and used to access synchronization and other services. The synchronization component 112 can also be used to push data to the serving system 102, when allowed, as part of a synchronizing operation. While features of the computing environment 100 are discussed in relation to mobile and other portable user devices, the access control component 104 can also be used to control access to certain data and/or services from a requesting system, application, or other component in other embodiments.

As discussed further below, if the quarantine state has been assigned to or associated with a user device or devices, the access control component 104 can operate to deny or prevent access to the requested services and/or data. For example, mobile devices that are newly introduced or unknown to a computer or communication environment, and requesting synchronization services and/or data, can be immediately quarantined by the access control component 104 absent or without interrupting an expected communication protocol or synchronization procedure of each device, preventing the device, server, and/or synchronization(s) from reaching an erroneous state (e.g., a software or communication error) and/or exiting out of the synchronization communication.

The access control component 104 of one embodiment can use granular quarantine operations in controlling access to some portion of the requested services and/or data. When using the quarantine state, and as part of a denial of access to an unknown or unrecognized device and/or client, the access control component 104 can operate to communicate acknowledgment, quarantined, and/or modified synchronization data and/or services that appear to be genuine from the device or synchronization component perspective. Correspondingly, the access control component 104 can use the quarantine state to satisfy device requests, such as would be the case under normal synchronization operations for example, without requiring a requesting device or client to be aware of the various access states in order to be compliant with the serving system 102.

For example, as part of a synchronization protocol, a synchronizing client may first attempt to retrieve a list of folders that the user can access and use to gain information from a subset of returned folders. In response, the serving system 102 can use the quarantine state to comply with a request without returning the user's actual folders, including withholding content from being dispersed to or from the client. Such a state can operate to prevent requesting clients from entering an erroneous state (e.g., not returning a user inbox after an e-mail synchronization request). Thus for this example, as part of using a quarantine state, the serving system 102 can respond to the requesting client with a genuine response (e.g., return a list of empty or modified folders, return a no data exists message, return a no new items message, return a no new changes message, etc.) without providing the requested data and/or services and disrupting communications with an unknown, unrecognized, or undetermined entity.

As one example, when a user's mobile device is in the quarantine state, the access control component 104 can operate to return an empty list or data set, a responsive message (e.g., no new data items, etc.), or some other acknowledgment confirming normal or valid synchronization operations between the requesting device and serving system 102. The serving system 102 can generate and/or send, or instruct another component to generate and/or send, an e-mail or other communication to inform the user of the quarantine state for the particular device and/or a reason of the state. For example, a text message or e-mail message can be sent to the requesting device to inform the user of the quarantine state and/or permitted and/or banned actions and access requirements, etc.

A user can update or otherwise configure (e.g., send additional information) a particular device to comply with a requisite trust or confidence level required for each device to use all or certain server services. At, or about, the time of a quarantine operation, the serving system 102 can generate and send, or instruct another component to generate and send, an e-mail or other communication to inform the administrator or other automation that the particular device and/or user has been assigned the quarantine state and that a determination needs to be made as to allowing or blocking the device from accessing and/or using data and/or service of the serving system 102.

The quarantine state can be used to return limited or modified information while restricting users from certain actions, like adding data into the serving system 102 or sending e-mail for example. Correspondingly, search queries and other user or device initiated requests can be blocked, allowing background processing to proceed while preventing access to actual data. For example, some requesting clients expect the serving system 102 to hang on to hypertext transfer protocol (HTTP) requests until a new e-mail arrives. The server can park the request(s) and return after some time without providing any content whether or not there actually is content available for the client. The quarantine state can be used without having a client alter existing synchronization code or functionality.

A scenario using the access control functionality is illustrated by the following example. Jane just purchased a mobile phone that allows her to retrieve e-mail and other corporate data from her company's server while out of the office. As part of a synchronization service request, Jane activates the mobile phone and enters her user credentials to connect to the server. Upon receiving the request, the access control features can operate to quarantine the mobile phone and notify server Administrators (e.g., e-mail, page, text, etc.) that Jane is trying to retrieve data. The access control features can also be used to send an e-mail to Jane, letting her know that the mobile device or client is being verified. Once the mobile device or client has been deemed adequate or compliant, the server provides access, at which point Jane's e-mails, calendar appointments, contacts, and/or other data requests start synchronizing to the client. If the client is not deemed secure enough, the server may provide some data while holding back other data (e.g., providing Jane's address book, but no e-mail).

The following is an example server output for Jane's device:

| | |
|---|---|
| DeviceAccessState: | Access Granted \| Access Denied \| Quarantined \| Gathering Client Information |
| AccessStateReason: | Global Permissions \| Individual Assignment \| Device Model Permissions \| Upgrade Grace Period |
| AccessControlRule: | PocketPC DeviceType Quarantined |
| FirstSyncTime: | 1/8/2009 2:06:26 AM |
| SyncStateUpgradeTime: | |
| LastPolicyUpdateTime: | 1/8/2009 2:30:02 AM |
| LastSyncAttemptTime: | 1/8/2009 3:59:24 AM |
| LastSuccessSync: | |
| DeviceType: | PocketPC |
| DeviceID: | 0AB48F8165C9C8BE080C74640D9D9AD6 |
| DeviceUserAgent: | MSFT-PPC/5.2.5000 |
| LastDeviceWipeRequestor: | janedoe@contoso.com |
| RecoveryPassword: | ******** |
| DeviceModel: | WindowsMobile200 |
| DeviceImei: | 98765432106543210 |
| DeviceFriendlyName: | WM_janeb2 |
| DeviceOS: | Windows CE 5.2.0 |
| DeviceOSLanguage: | English |
| DevicePhoneNumber: | *******0543 |
| DeviceEnableOutboundSMS: | True |
| DeviceMobileOperator: | MyMobileOperator |
| Identity: | contoso.com/Users/Jane/ExchangeActiveSyncDevices/PocketPC§0AB48F8165C9C8BE080C74640D9D9AD6 |
| DeviceEASVersion: | 12.1 |
| DevicePolicyApplied: | Default |
| DevicePoliciesStatus: | Applied in Full \| Partially Applied \| Not Applied \| Externally Managed |

As shown in the example above, various control settings are used to control access by Jane and/or the phone to certain data and/or services.

As described above, depending in part on the particular requesting source (user, device, system, application), the access control component 104 can be used to provide granular access and quarantine operations, to thereby communicate portions of the requested information, while restricting and/or blocking other communications. For example, based in part on the trust level of the requesting user and/or device, the access control component 104 can operate to enable the synchronization of contact and calendar data, while not allowing the particular user device/system/application to use e-mail services, including e-mail synchronization services. Such settings can be applied locally or globally across a computing environment, such as in an enterprise, web-based, or other network. Moreover, access control can be based on an individual, group, device, or some other basis.

As shown in FIG. 1, the exemplary computing environment 100 includes a serving system 102 and a user device 110, each including at least one processor and computer storage or memory, in communication with one another using one or more networks or communication couplings, but is not so limited. While one computing system 102 and device 110 are shown, the computing environment 100 is not so limited and can include any number and types of such systems and other components. Additionally, components and/or functionality can be combined, modified, or further divided. One exemplary computing environment 100 can include a serving system 102 in communication with one or more of a plurality of user computers, such a number desktops, laptops, portable devices, music/video devices etc., having a variety of applications, such as an operating system, synchronization application, word processing application, e-mail application, calendar application, etc.

Figure 2:
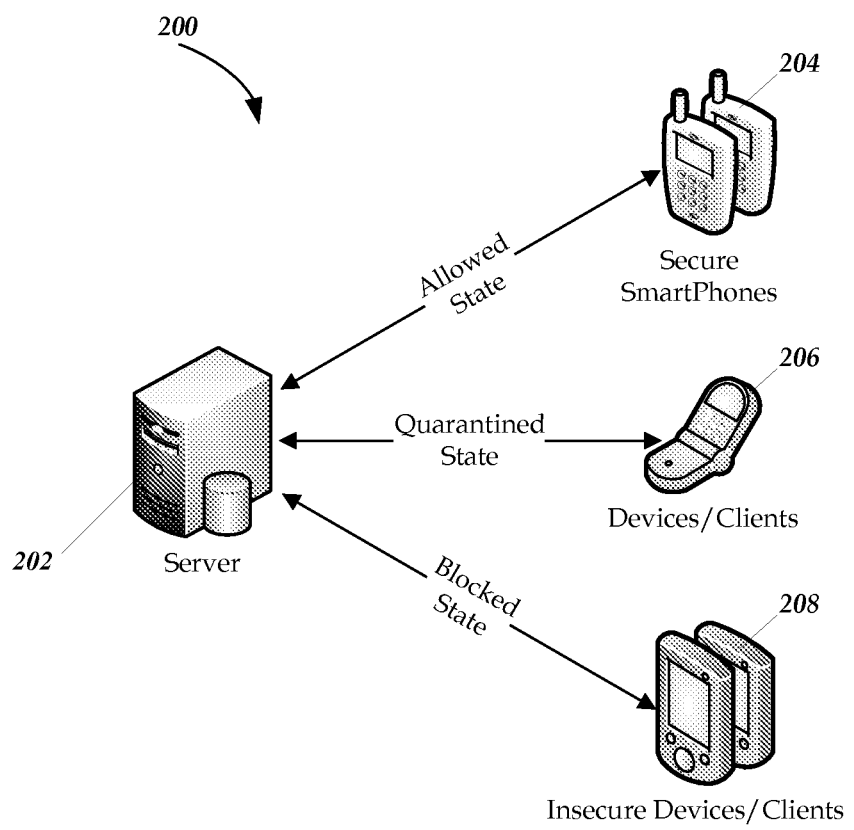
FIG. 2 is a block diagram of an exemplary computing environment.

FIG. 2 is a diagram which depicts an exemplary communication environment 200 including a server 202 communicatively coupled to a number of user devices, such as secure smartphones 204, devices/clients 206, and insecure devices/clients 208. For example, each user device can include a synchronization application or component, such as an ActiveSync® synchronization application for example, to update various information, such as calendar items, contact folders and items, task folders and items, picture folders and items, document folders and items, e-mail folders and items, etc.

As shown in the example of FIG. 2, the server 202 has assigned an allowed state to the secure smartphones 204 corresponding to allowable devices which are allowed to access and/or use data and/or services of the server 202. The server 202 has also assigned the quarantined state to devices/clients 206, such as new, unrecognized, and/or devices not meeting a requisite trust level for example, corresponding to quarantined devices which are denied access to all or certain data and/or services of server 202.

As described above, the server 202 can continue communication operations with a quarantined device/client by providing certain controlled data and/or service(s) to the device/client during a period where a trust or confidence level can be ascertained for each quarantined device/client. The server 202 can also send, or direct another component to send, a communication to the device/client user and/or an administrator or other assessing entity (e.g., access control component 104) of the quarantine assignment and/or status. The user can feel comfortable that the device is operating properly while the server 202 or administrator for example, determines whether to transition to another access state.

As shown in FIG. 2, the server 202 has assigned a blocked state to insecure devices/clients 208 corresponding to blocked devices/clients which are barred from using data and/or services of server 202. In one embodiment, the server 202 can stamp a time and/or date and/or additional information into a directory structure when one or more of the states are associated with each device/client issuing a data and/or service(s) request. The server 202 or other component can use the stamp and any additional information to determine device/client access status and/or implement state transitions within the computing environment 200, as described below.

Figure 3A:
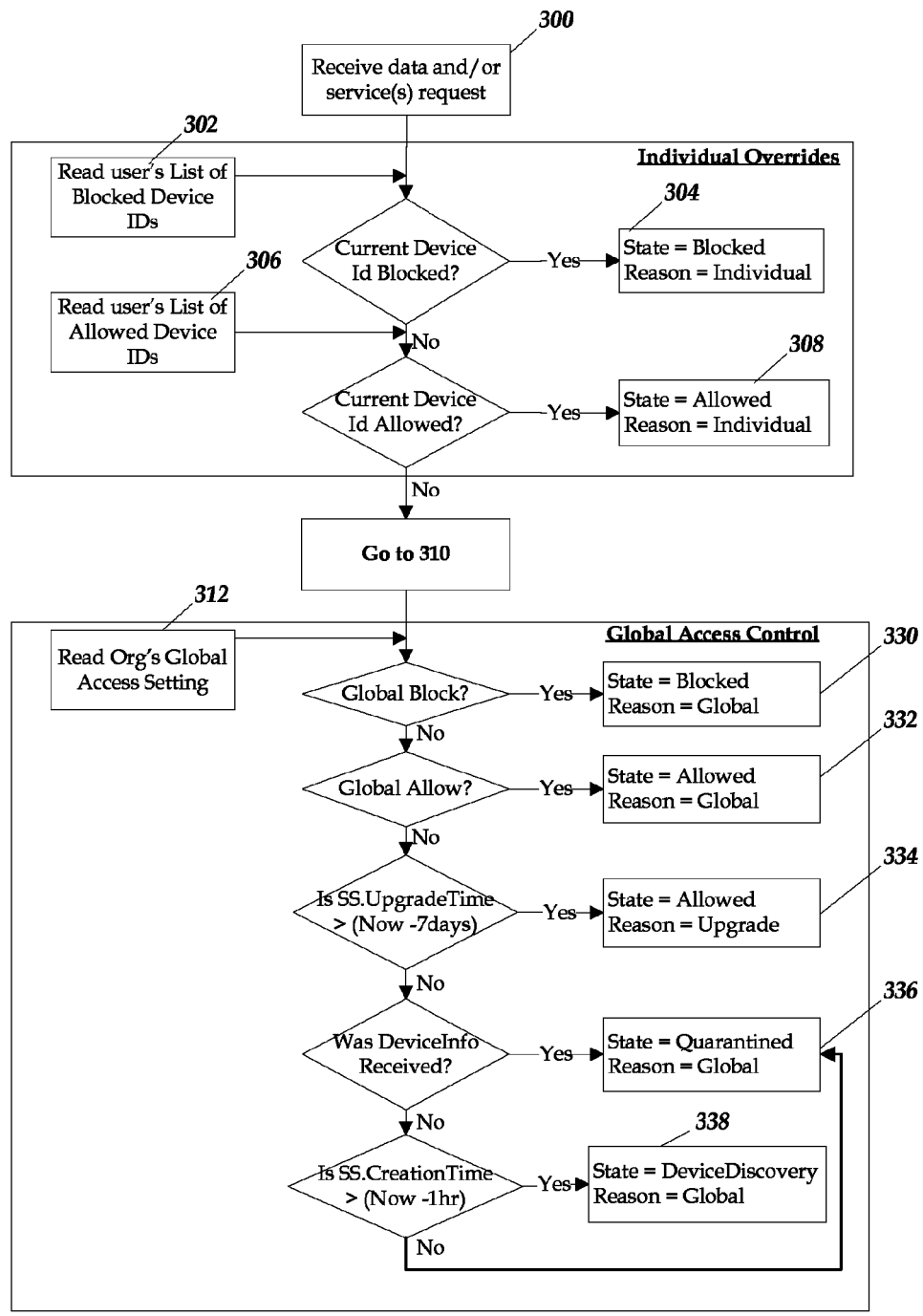
FIGS. 3A-3B are flow diagrams illustrating an exemplary process of controlling access to synchronization services of a computing environment.
Figure 3B:
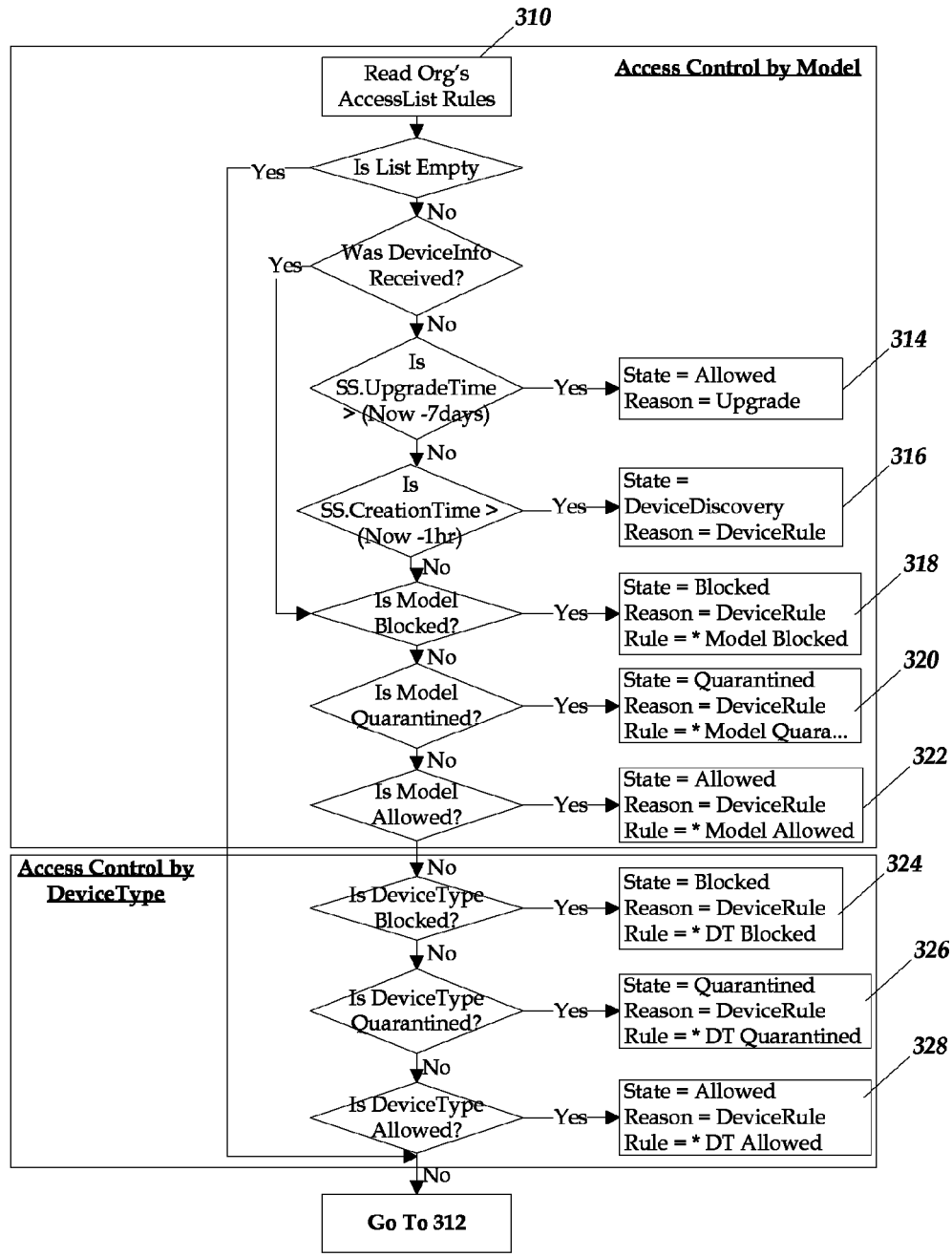

FIGS. 3A-3B are flow diagrams illustrating an exemplary process of controlling access to synchronization services of a computing environment. For example, the exemplary process can be used to control access to synchronization services that provide synchronization operations by a server or serving system (e.g., Exchange® by Microsoft® Corporation). Accordingly, in one embodiment, the process can be implemented in a machine as machine or computer readable instructions which, when executed, control synchronization and other operations.

As shown in FIGS. 3A-3B, at 300, a request for synchronization services is received from a client device. For example, a serving computer used in controlling the synchronization operations, can receive a request for synchronization services from a smartphone user who has activated a synchronization mode to request synchronization services or other services from an enterprise serving system that includes user e-mail, contacts, and calendar appointments. In other embodiments, a synchronization mode can be automatically initialized by the device and/or serving computer based in part on the relationship of the user to the receiving computer, device, or system.

In one embodiment, the user's identity or access credentials, such as a username and a password for example, are transmitted as part of the request. In another embodiment, the receiving component, such as a serving computer or associated application for example, can control access based in part on the type or functionality of a particular device transmitting the request. A particular device may be able to provide more or less identification information than other devices. Wired and/or wireless communication coupling can be used as communication means between components of a computing environment or network.

According to one embodiment, a serving computer or associated application can utilize device information received from the client device in making access control determinations. For example, many newer devices can automatically provide certain device information as part of a synchronization request, such as Model, device identification (ID), serial number, origin, operating system and version, etc. In some cases, certain devices may be limited regarding the amount of information that can be or is transmitted to the serving computer with the request. For example, some older model devices may only transmit the model type of each device as part of a synchronization request to an enterprise server or servers providing the synchronization services and controlling the release and/or access of information.

At 302, the access control component reads a list of blocked device IDs associated with the requesting user from a dedicated or other computer storage medium. Each blocked list can include any number of devices/systems. For example, a blocked list may include a number of devices that have been deemed untrustworthy by not complying with or conforming to certain enterprise policies and security procedures. If the device ID of the requesting device is included in the user's blocked device list, the flow proceeds to 304 and the requesting device is blocked from using the synchronization and/or other services depending in part on a particular implementation.

If the device ID of the requesting device is not included in the user's blocked device list, the flow proceeds to 306 where the access control component reads a list of allowed device IDs associated with the requesting user from a dedicated or other computer storage medium. Each allowed list can include any number of devices/systems. For example, an allowed list may include a number of devices that have been deemed trustworthy by complying with or conforming to certain enterprise policies and security procedures.

If the device ID of the requesting device is included in the user's allowed device list, the flow proceeds to 308 and the requesting device is allowed to access and use the synchronization and/or other services depending in part on a particular implementation and the flow proceeds to 310. In one embodiment, as described above, the access control component can adjust the amount and/or type of information released to or accessed by the requesting device that is ultimately allowed to communicate with the serving computer.

In an alternative embodiment, based in part on a blocking precedence, the allowed, blocked, and/or quarantined lists can all be read upon receiving the request, wherein devices in the blocked list are blocked even if included in the allowed and/or quarantined lists. For example, if the requesting device is included in both of a user's blocked list and an allowed list, then the access control component blocks the device. At 310, the access control component reads a list of access-based rules associated with the computing environment. For example, the access control component can read any implemented rules from an access list of enterprise users stored in an enterprise database. If the list is empty, the flow proceeds to 312, discussed further below.

As described above, the amount of identification information that can be provided by each requesting device or client may be limited or not, depending in part on the functionality of a particular device and/or synchronization component. If certain device information was not transmitted as part of the request and a safe state upgrade time is greater than a predetermined amount of migration time (e.g., within a given amount of time (seven days, two weeks, etc.)), the flow proceeds to 314 and the requested device is allowed to access the synchronization services or some portion thereof for the reason of upgrade. For example, the safe state upgrade time can be used as a migration time period when migrating from a previous server version to a new server or upgraded version of the server.

If the safe state upgrade time is not greater than the predetermined amount of time and a safe state creation time is greater than a predetermined amount of time (e.g., within a given amount of time (one hour, thirty minutes, etc.), from the synchronization request for example, and the flow proceeds to 316 where the access control component assigns or associates a device discovery state to the requesting device. For example, to avoid the risk of misclassifying clients, the serving system 102 can wait for the clients to send device information, including defining a required time for a client to provide the information.

In one embodiment, if the client did not provide model information, a promoted device type can be used to decide whether or not to apply an access rule to the particular client. Correspondingly, as part of assigning or associating the device discovery state, the access control component can also assign and use a device or other rule to control device access and communications, wherein the rule corresponds to the factors and/or parameters resulting in the assignment of the device discovery state for the particular device. For example, a device model parameter can be used to check against all implemented model based rules within a communication network. If there is a match, the associated rule state controls the client's state.

If the model information of the requesting device was received by the server and the safe state upgrade time is not greater than the predetermined amount of migration and the safe state creation time is not greater than a predetermined safe state creation time, the access control component determines an access state of the model within the computing environment. For example, the access control component can query a database of device and other identification information for each user that includes allowed, quarantined, and/or blocked models of the computing environment.

If the access control component determines that the model is blocked, the flow proceeds to 318 and the access control component assigns a blocked state to the requesting device. If the access control component determines that the model is quarantined, the flow proceeds to 320 and the access control component assigns a quarantined state to the requesting device. If the access control component determines that the model is allowed, the flow proceeds to 322 and the access control component assigns an allowed state to the requesting device.

Similar to the rule assignment for the discovery state, the access control component of an embodiment can also assign and use a device or other rule for the requesting device corresponding to the reasons that resulted in a blocked state, quarantined state, and/or allowed state for each device model. For example, a device type parameter can be used to check against all implemented device type based rules and, if there is a match, the associated rule state controls the client's state. In an embodiment, device identifiable properties may be hierarchical thereby requiring that the access control model take into account the order in which properties are to be checked. In the example shown, the device model is a child node of the device type and therefore takes precedence in the hierarchical assignment of access state.

If the access control component is unable to determine a device state from the model information, the access control component can use the device type information (if provided by the requesting device) to determine if the device type of the requesting device has been blocked, quarantined, and/or allowed. If the access control component determines that the device type of the requesting device is blocked, the flow proceeds to 324 and the access control component assigns a blocked state to the requesting device.

If the access control component determines that the model is quarantined, the flow proceeds to 326 and the access control component assigns a quarantined state to the requesting device. If the access control component determines that the model is allowed, the flow proceeds to 328 and the access control component assigns an allowed state to the requesting device. As described above, the access control component can also implement a device or other rule for the requesting device corresponding to the reasons that resulted in a blocked state, quarantined state, and/or allowed state for each requesting device attempting to access services and/or data.

If the access control component is unable to determine an access state of the requesting device based in part on model or device type or some other parameter, the flow proceeds to 312 and the access control component operates to read the global access setting associated with the computing environment. For example, if the requesting device is new or being reintroduced to the computing environment, the access control component can read an enterprise's global access setting from a dedicated storage. The global access settings can be used to globally control access to one or more resources of a computing environment.

If the global access setting is at a blocked state, the access control component blocks the device from the computing environment at 330. If the global access setting is at an allowed state, the access control component allows the device to access one or more services of the computing environment at 332, such as synchronization services for example. If the global access setting for the computing environment is not set to a global allow or a global block, and if the safe state upgrade time is greater than a predetermined amount of migration time, the flow proceeds to 334 and the requested device is allowed to access the synchronization services or some portion thereof for the reason of upgrade, as discussed above.

If the safe state upgrade time is within a predetermined amount of time, such as an allotted migration time for example, and if device information was received from the requesting device, the access control component assigns a global state of quarantined to requesting device at 336. If the safe state upgrade time is not within the predetermined amount of time, and if device information was not received from the requesting device, the access control component assesses whether a safe state creation time is greater than a predetermined amount of time. If within the amount of time, the access control component 104 assigns a global state of device discovery to the requesting device at 338.

If not within the amount of time, the flow returns to 336 and the access control component assigns a global state of quarantined to requesting device. In an embodiment, while under quarantine or during device discovery, an administrator, control component, and/or some automation can be used to further investigate various aspects of the requesting device, such as a trust or confidence level for example, based in part on received or gathered device information. For example, the device model and/or other device or user information can be used to ascertain a level of security or trust to attribute to the requesting device or user to determine whether to allow or block the particular device.

Any additionally harvested or collected information can also be added to a computer readable storage repository (e.g., a database of the computing environment) for further use, such as in making further synchronization and data/service control decisions for example. Once resolved, the administrator, access control component, or some other component, system, or implemented automation can analyze aspects of a particular request in determining whether to transition from the quarantined state to an allowed state or blocked state, including transitions from the quarantined state for a particular data set and/or service to an allowed state to enable access to the data set and/or service; while blocking access to other data sets and/or services. While embodiments describe aspects of access determination and use, including the controlling of synchronization and other communication operations, features of various embodiments can be applied to other communication operations.

Figure 4:
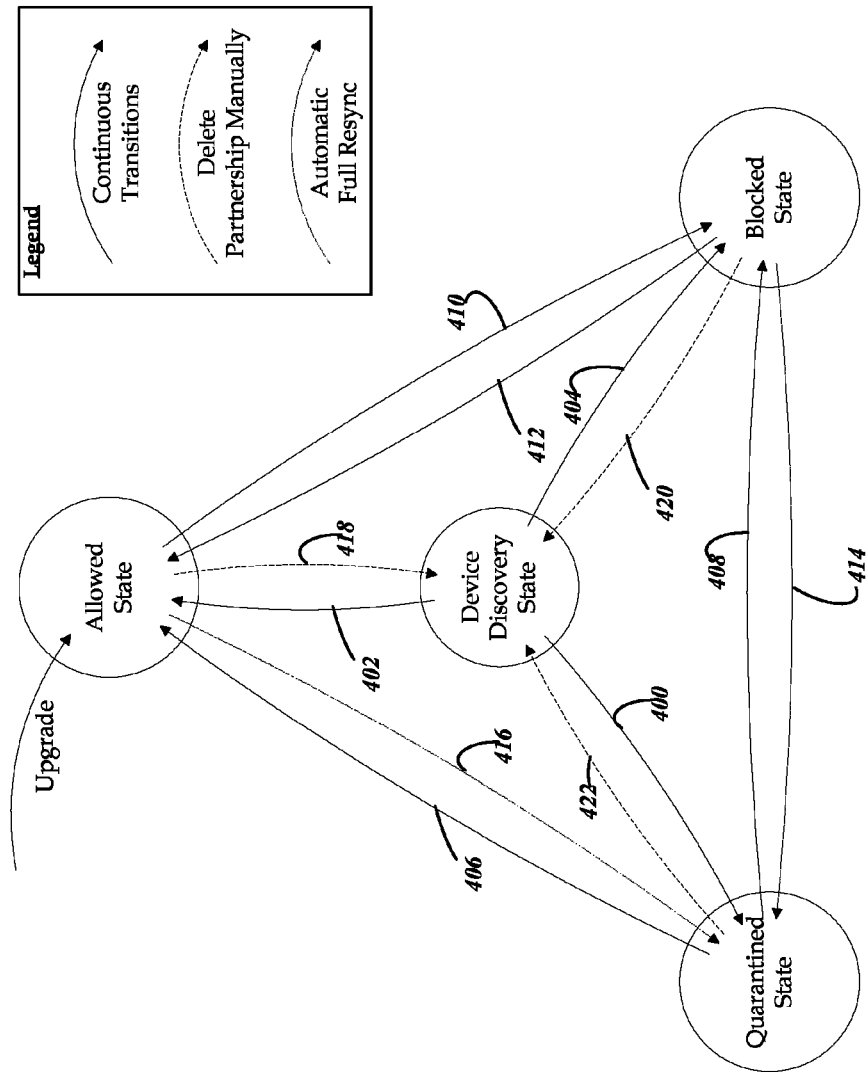
FIG. 4 is a state transition diagram depicting exemplary transitions between access states within a computing environment.

FIG. 4 is a state transition diagram depicting exemplary transitions between access states within a computing environment. In one embodiment, various transitions are based in part on continuous transition operations, manual partnership deletion operations, and/or automatic full resynchronization operations. As shown in FIG. 4, the continuous transition operations include, but are not limited to: a device discovery state to a quarantined state transition 400; the device discovery state to an allowed state transition 402; the device discovery state to a blocked state transition 404; the quarantined state to the allowed state transition 406; the quarantined state to the blocked state transition 408; the allowed state to the blocked state transition 410; and, the blocked state to the allowed state transition 412.

The automatic full resynchronization operations include, but are not limited to: the blocked state to the quarantined state transition 414 and the allowed state to the quarantined state transition 416. The manual partnership deletion operations include, but are not limited to: the allowed state to the device discovery state transition 418; the blocked state to the device discovery state transition 420; and, the quarantined state to the device discovery state transition 422. State transitions can be implemented in a number of ways based on the desired client behavior(s) and FIG. 4 provides a number of exemplary transitions.

In an embodiment, state transitions can be detected by comparing a previously stored value for an access state with a newly computed value associated with a requesting device or client (see FIGS. 3A-3B). Upon completing the current client request in which the transition was detected, the access sate can be updated with the new value of the access state and a reason for the transition can be stored in a computer storage component for example. In one embodiment, the device discovery state can be used as a starting point for all new or unrecognized devices brought to synchronize with a synchronization host, such as a server for example. Transitioning from another state to the device discovery state of an embodiment can be accomplished by deleting the synchronization state and attributes (e.g., ActiveDirectory® attributes) tied to the particular client partnership to thereby guarantee that all devices in the quarantine state have a limited or minimal amount of device information shared with the server.

As described, above a server or other access or communication control component can be used to assign, determine, and/or use an access state of a given device to control device communications. In one embodiment, layers of control can be used to determine an access state, including but not limited to: an individual's allow and block list which consists of the device IDs or other identifiers to be allowed or blocked; an organization wide list of devices along each associated access state, composed of, but not limited to: a list of Model strings to associate with access states and/or a list of device type strings to associate with access states; and/or, an organization wide global setting can be used to define a default access state to be applied to unlisted devices. The layers can be checked in a given order to provide administrators with a means to bypass organization wide settings as depicted in FIGS. 3A and 3B.

While a number of methods, components, and functionality have been described above, other methods, components, and/or functionality can be implemented in other embodiments, including order and/or types of operations to implement certain access control functionality, and other embodiments are available. The computing environments, systems, and/or embodiments described herein can be configured to include networking, security, and/or other communication functionality to provide a communicative environment. Accordingly, the environments and components include functionality to communicate with other computing devices, communication devices, and/or other systems and are not intended to be limited to the embodiments and examples described herein. Moreover, components can be configured to communicate via a wired, wireless, and/or combination of various communication networks.

The computing environments and systems described herein can be configured as a networked environment that includes software, firmware, hardware, and other components to provide a distributed computing environment under certain embodiments. Additionally, while a certain number and configuration of components are described and shown, other numbers of components and configurations can be used. For example, a computing environment can include a plurality of computing devices, clients, servers, repositories, and/or other components.

Exemplary Operating Environment

Figure 5:
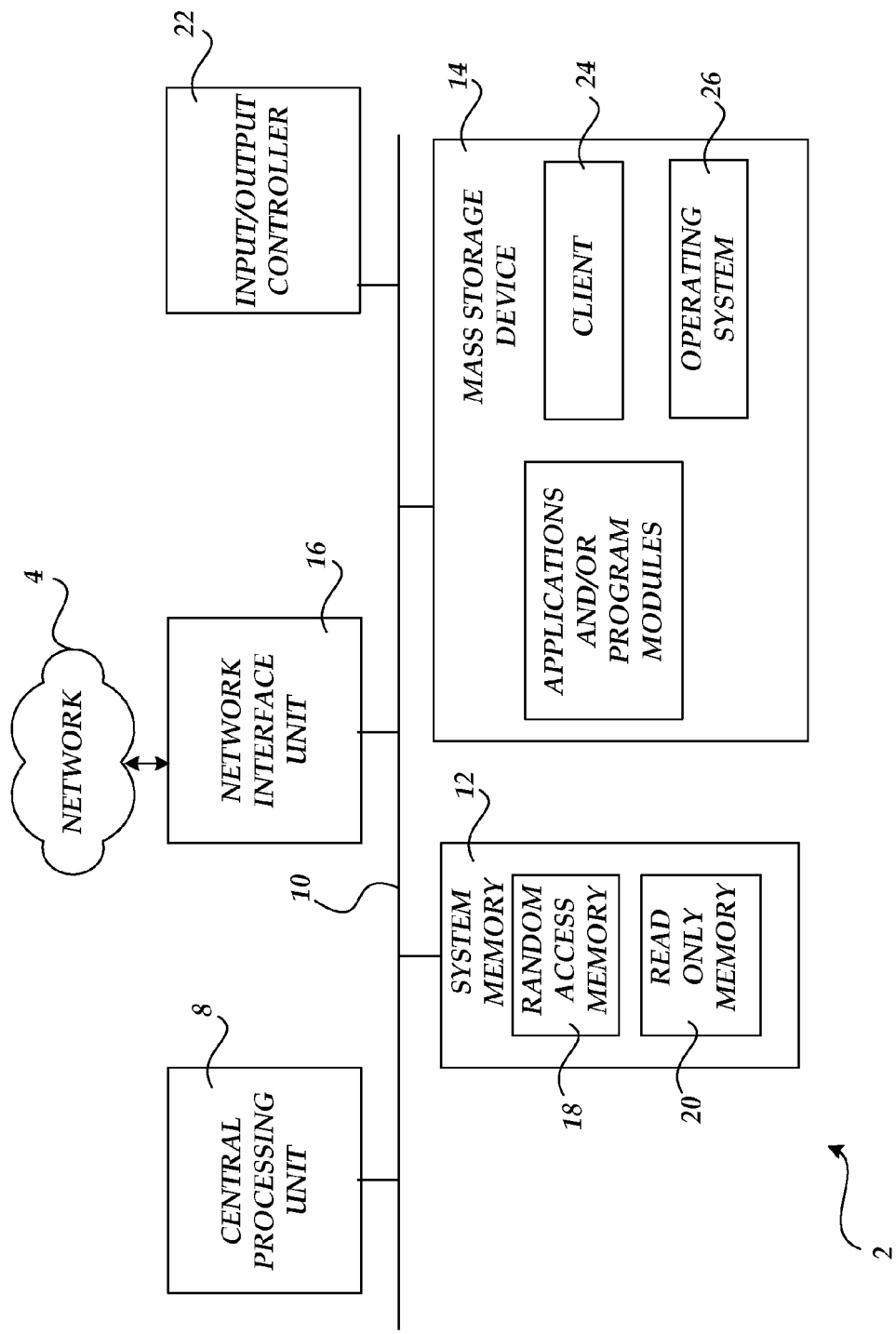
FIG. 5 is a block diagram illustrating an exemplary computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system, application programs and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 26 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a client 24 (e.g., synchronization client), word processing application, media player application, messaging application, e-mail application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computing system comprising:
a processor and computer storage;
an access control component to control access to system services and data using a number of access states including a blocked state, an allowed state, a device discovery state, and a quarantined state by:
receiving a service request including device parameters from a device requesting the system services and data;
associating a synchronization time with the service request;
blocking the device from the system services and data using the blocked state if a trust level is less than a requisite trust level required by the computing system;
allowing the device to access and use the system services and data using the allowed state if the trust level is greater than or equal to the requisite trust level;
artificially quarantining the device using the device discovery state if recently introduced to the computing system including temporarily delaying access and use of the system services and data while determining the trust level of the device;
quarantining the device to prevent access and use of the system services and data using the quarantined state if the trust level of the device is unknown, the quarantining including providing quarantine data to the device without providing the requested services and data to the device; and,
storing the access state of the device in the computer storage.

2. The system of claim 1, wherein quarantining the device includes identifying device trust features.

3. The system of claim 1, wherein artificially quarantining the device includes implementing a device discovery mode during the device discovery state to identify device trust features.

4. The system of claim 1, wherein the access control component controls the access and use further by transitioning from one assigned access state to a different access state.

5. The system of claim 1, wherein the access control component controls the access and use further by transitioning from one of the device discovery state and the quarantined state to one of the allowed state and the blocked state.

6. The system of claim 1, wherein access state control is based in part on one of a model and device type of the device.

7. The system of claim 1, further configured to generate and communicate an electronic communication to a user of the device of the quarantine state and a denied access to synchronization services.

8. The system of claim 1, further configured to generate and communicate an electronic communication to an administrator to take action in determining whether to transition from the quarantined state to one of the blocked state and the allowed state.

9. The system of claim 1, wherein the access control component transmits a no item change acknowledgment as part quarantining the device even if changed items associated with a synchronization request exist.

10. The system of claim 1, wherein the access control component is further configured to automatically discover a trust level of the device.

11. The system of claim 1, wherein the access control component is further configured to block the device if the device has been in the quarantine state and lacks the requisite trust level.

12. The system of claim 1, wherein the access control component is further configured to allow access to allowed services and data and limit access to quarantined services and data.

13. A method of controlling synchronization operations associated with synchronization services within a computing environment comprising:
controlling access to the synchronization services based in part on mobile client request parameters received from a number of mobile clients by using a number of access states including a blocked state, an allowed state, a device discovery state, and a quarantined state, the controlling access including:
assigning the blocked state to each untrustworthy mobile client to block access to the computing environment;
assigning the allowed state to each trustworthy mobile client to allow access to the computing environment including using the synchronization services;
assigning the device discovery state to each new mobile client to the computing environment, including controlling an amount of time from which to transition from the device discovery state to another access state; and,
assigning the quarantined state to each unknown mobile client to delay normal synchronization operations of each unknown mobile client while communicating modified synchronization data customized to a communication request of each unknown mobile client; and,
storing each access state for each mobile client in computer storage.

14. The method of claim 13, further comprising maintaining a synchronization protocol while returning the modified synchronization data.

15. The method of claim 13, further comprising transitioning from the quarantined state to one of the allowed state and the blocked state after determining a trust level for the unknown mobile client.

16. Computer storage device which stores instructions that control access to synchronization data by:
receiving synchronization requests including user access and device parameters from requesting computing devices requesting synchronization data;
assigning a synchronization creation time to each synchronization request;
using a number of access control states including a blocked state, an allowed state, a device discovery state, and a quarantined state;
blocking an unapproved computing device from accessing the requested synchronization data and using the blocked state to identify that the unapproved computing device is blocked and unapproved;
allowing an approved computing device to access the requested synchronization data and using the allowed state to identify that the approved computing device is allowed and approved;
using the device discovery state to artificially quarantine a recently introduced computing device that includes temporarily delaying access and use of services and data while determining a trust level of the recently introduced computing device;
quarantining an unidentified computing device having an undetermined trust level to prevent access of the synchronization data including using the quarantined state to identify that a trust level for the unidentified computing device is being determined, the quarantining including returning empty data to the unidentified computing device corresponding to the requested synchronization data to maintain a synchronization protocol; and,
storing each state of each computing device and a reason for each state.

17. The computer storage device of claim 16, further comprising communicating a quarantined message to a computing device user to inform of the quarantined state.

18. The computer storage device of claim 16, wherein the received device parameters include a model, device identification (ID), and International Mobile Equipment Identity (IMEI).

* * * * *